US006531954B1

(12) United States Patent
Kim

(10) Patent No.: US 6,531,954 B1
(45) Date of Patent: Mar. 11, 2003

(54) ANTI-THEFT CIRCUIT FOR PORTABLE DEVICE

(75) Inventor: Si Hyeon Kim, Kyongsangbuk-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

(21) Appl. No.: 09/290,544

(22) Filed: Apr. 12, 1999

(30) Foreign Application Priority Data

Aug. 28, 1998 (KR) ........................................... 98-35245

(51) Int. Cl.[7] ............................................... B60R 25/10

(52) U.S. Cl. ........................ 340/5.21; 340/426; 340/5.3

(58) Field of Search ................................ 340/5.21, 5.6, 340/5.3, 5.26, 5.24, 825.52, 426; 307/10.2, 10.5; 375/130, 135, 136, 140, 141, 146, 147; 380/286

(56) References Cited

U.S. PATENT DOCUMENTS 5,497,395 A * 3/1996 Jou ............................ 370/209
5,644,172 A 7/1997 Hodges ...................... 307/10.5
5,644,591 A 7/1997 Sutton ........................ 375/142
5,689,525 A * 11/1997 Takeishi et al. ............ 375/141
5,793,306 A * 8/1998 Vershinin et al. ...... 340/825.69
6,144,113 A * 1/2000 Hayashi et al. ............ 307/10.5
RE36,752 E * 6/2000 Koopman, Jr. et al. ..... 380/262
6,075,809 A * 6/2000 Naruse ....................... 375/147
6,088,347 A * 7/2000 Minn et al. ................. 370/342
6,181,238 B1 * 1/2001 Garret, Sr. et al. ......... 340/426
6,181,252 B1 * 1/2001 Nakano ..................... 340/5.26
6,314,128 B1 * 11/2001 Bunker et al. .............. 375/149

* cited by examiner

*Primary Examiner*—Edwin C. Holloway, III
(74) *Attorney, Agent, or Firm*—Birch, Stewart, Kolasch & Birch, LLP

(57) ABSTRACT

Anti-theft circuit for a portable device, is disclosed, in which a correlation in a PN(Pseudo Random Number) sequence is employed for effective prevention of a portable device from being thieved, the anti-theft circuit including a transmission block disposed in the portable device having a block for generating a particular pseudo random number sequence and a multiplication block for always multiplying a 'high' value to an output of the block for generating a particular pseudo random number sequence, the transmission block for converting an output of the multiplication block into an analog value and transmitting the analog value, and an anti-theft sensing circuit separate from the portable device for receiving a signal transmitted form the transmission block, sampling the signal, multiplying a sampled value to a pseudo random number sequence identical to a case of the transmission block, summing for a time period, comparing to a preset threshold value, and selectively providing an alarm signal to outside thereof according to a result of the comparison.

10 Claims, 6 Drawing Sheets

ANTI-THEFT CIRCUIT FOR PORTABLE DEVICE

BACKGROUND OF THE INVENTION

1. Field of the Invention

The present invention relates to an anti-theft circuit, and more particularly, to an anti-theft circuit for a portable device, in which a correlation in a PN(Pseudo Random Number) sequence is employed for effective prevention of a portable device from being thieved.

2. Background of the Related Art

FIG. 1 illustrates the steps of an exemplary generation of a general pseudo-random number sequence, with three bits of a delay bit size. If initial values of the delay bits are '1 0 0', delay bits are shifted to repeat in an order of 0 0 1, 0 1 0, 1 0 1, 0 1 1, 1 1 1, 1 1 0, with a period of $2^3-1$, i.e., 7 chips. The pseudo-random number sequence generated in this case is '1 0 0 1 0 1 1', which is repetitive.

As an exemplary related art anti-theft circuit, a car anti-theft circuit will be explained with reference to the attached drawings. FIG. 2 illustrates a block diagram of a transmission system in the related art anti-theft circuit, and FIG. 3 illustrates a block diagram of a reception system in the related art anti-theft circuit.

The related art car anti-theft circuit is provided with electrical systems in a car, a controller disposed between electrical components in each of the electrical systems and a power supply block, and a transmitter for transmitting an activating signal to the controllers. The controllers are supplied of power from the power supply block in the car. The controller maintains its power path to the electrical component cut-off until the controller receives an encoded and transmitted activating signal when the controller decodes and compares to a value stored in advance, to establish a power supply path and put the electrical component into regular operation if the value is same. When the encoded, and transmitted signal is not the same as the value stored in the controller under an irregular condition, the power supply path to the electrical component is not established. As a result, the electrical component is not put into regular operation, allowing a theft prevention signal to be transmitted from the transmitter with a signal of an audible frequency band or a low powered FM system signal.

The transmission system in the aforementioned related art car anti-theft circuit has a system as shown in FIG. 2.

Referring to FIG. 2, the transmission system is provided with a power supply block 11, a switching block 12 for switching a power supplied from the power supply block 11, an encoder 13 for encoding a particular signal upon reception of the power under the switching of the switching block, and a transmitter 14 for transmitting the signal encoded in the encoder 13.

FIG. 3 illustrates a reception system in the car anti-theft circuit.

Referring to FIG. 3, the reception system in the car anti-theft circuit has a voltage regulating unit 22 for regulating a voltage level supplied from a power supply unit 21, a receiver 23 disposed between the electrical systems in the car for receiving the activating signal transmitted from a transmitter 22 in the transmission system, a decoder/comparator unit 24 for decoding the activated signal received through the receiver 23 and comparing to a value stored in advance, and a switching block 25 for selectively switching a voltage in the voltage regulating unit 22 according to a result of comparison in the decoder/comparator unit 24. In the car anti-theft circuit having the transmission system and the reception system, a particular active signal is transmitted and sensed, to cut off a power supply circuit selectively in an action of theft prevention of a car.

However, because the related art anti-theft device should encode and decode a particular signal, for making an anti-theft action according to a result of the comparison, the related art anti-theft device requires a decoding block, and can not provide a particular signal source.

SUMMARY OF THE INVENTION

Accordingly, the present invention is directed to an anti-theft device for a portable device that substantially obviates one or more of the problems due to limitations and disadvantages of the related art.

An object of the present invention is to provide an anti-theft circuit for a portable device which can effectively prevent a portable device from being thieved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the anti-theft circuit for a portable device, in which a correlation in a PN(Pseudo Random Number) sequence is employed for effective prevention of a portable device from being thieved by issuing an alarm when a portable device is out of preset range which causes a difference of a time offset in the PN sequence, includes a transmission block disposed in the portable device having a block for generating a particular pseudo random number sequence and a multiplication block for always multiplying a 'high' value to an output of the block for generating a particular pseudo random number sequence, the transmission block for converting an output of the multiplication block into an analog value and transmitting the analog value, and an anti-theft sensing circuit separate from the portable device for receiving a signal transmitted form the transmission block, sampling the signal, multiplying a sampled value to a pseudo random number sequence identical to a case of the transmission block, summing for a time period, comparing to a preset threshold value, and selectively providing an alarm signal to outside thereof according to a result of the comparison.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
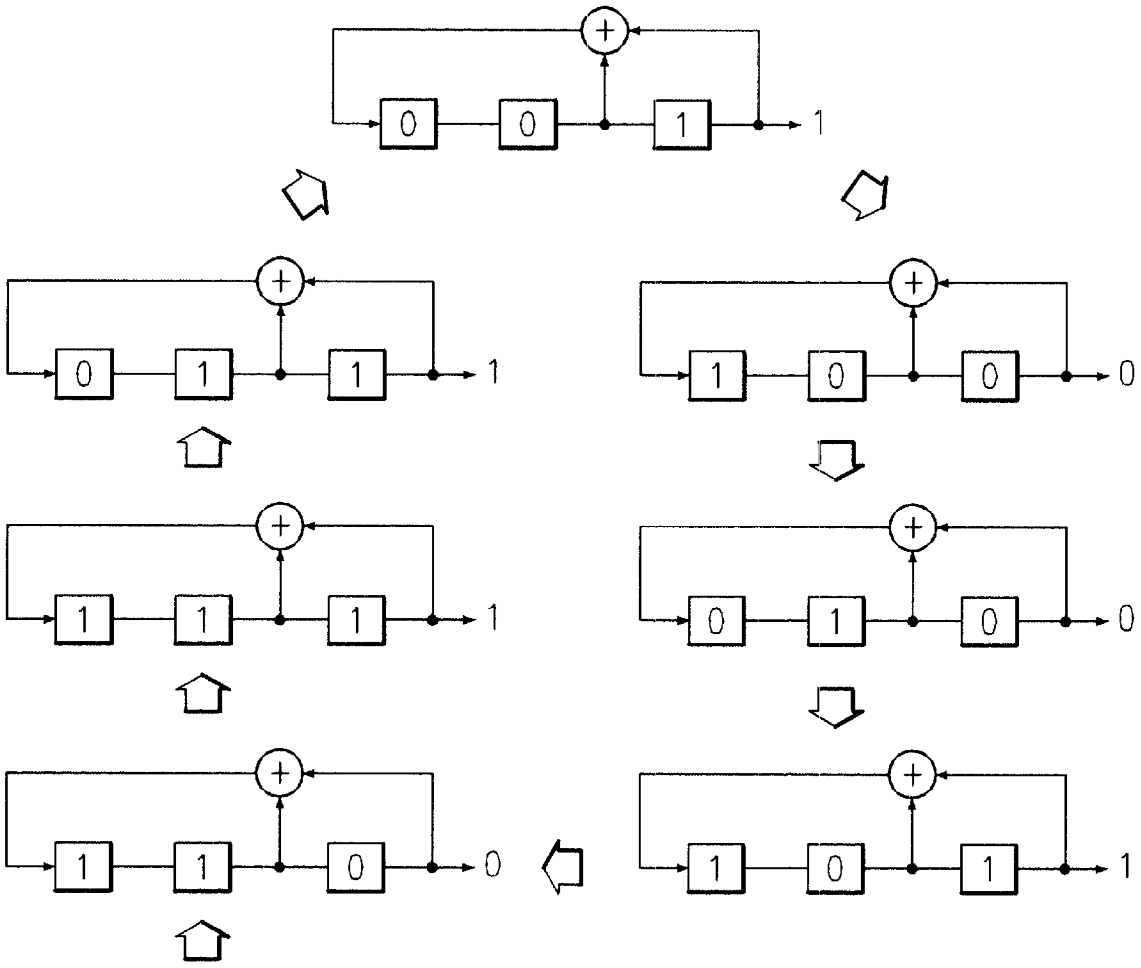
FIG.1 Related Art
FIG. 1 illustrates the steps of an exemplary generation of a general pseudo- random number sequence.
Figure 2:
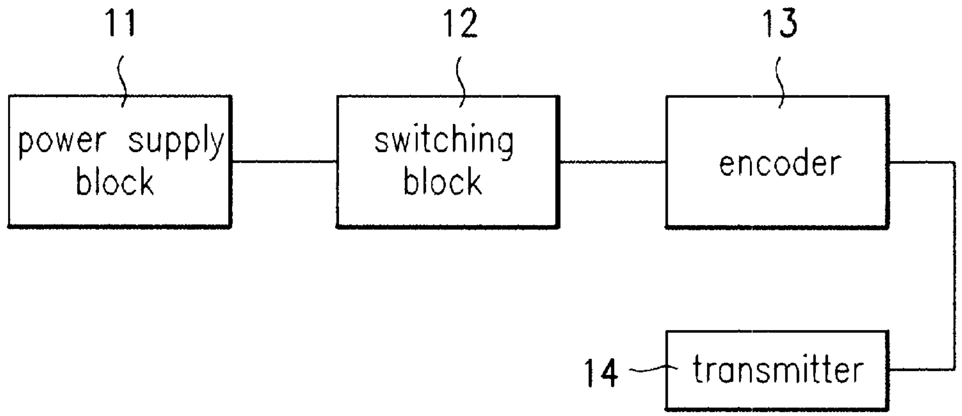
FIG.2 Related Art
FIG. 2 illustrates a system of a transmission system in a related art anti-theft circuit.
Figure 3:
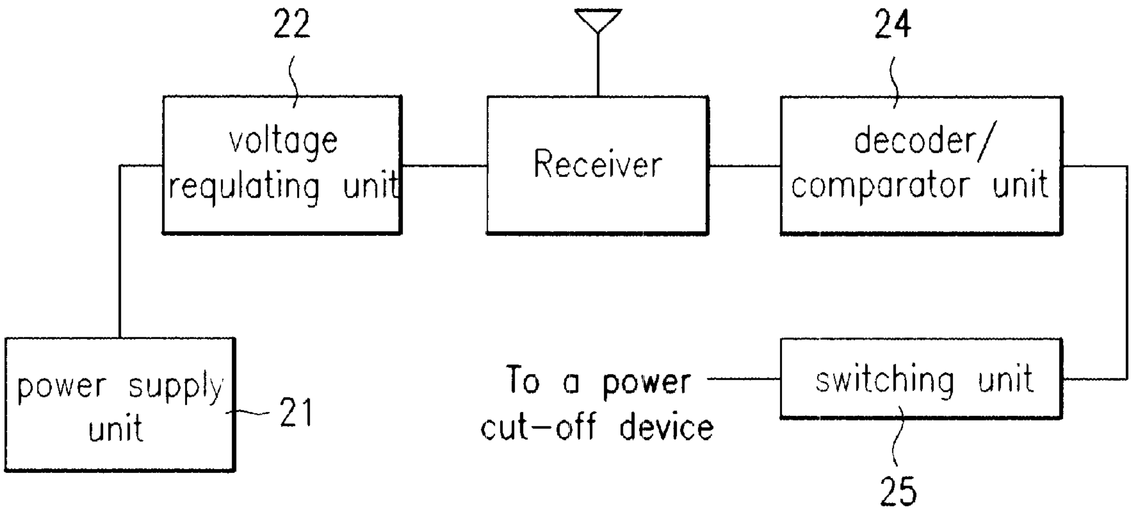
FIG. 3 illustrates a block system of a reception system in a related art anti-theft circuit.
Figure 4:
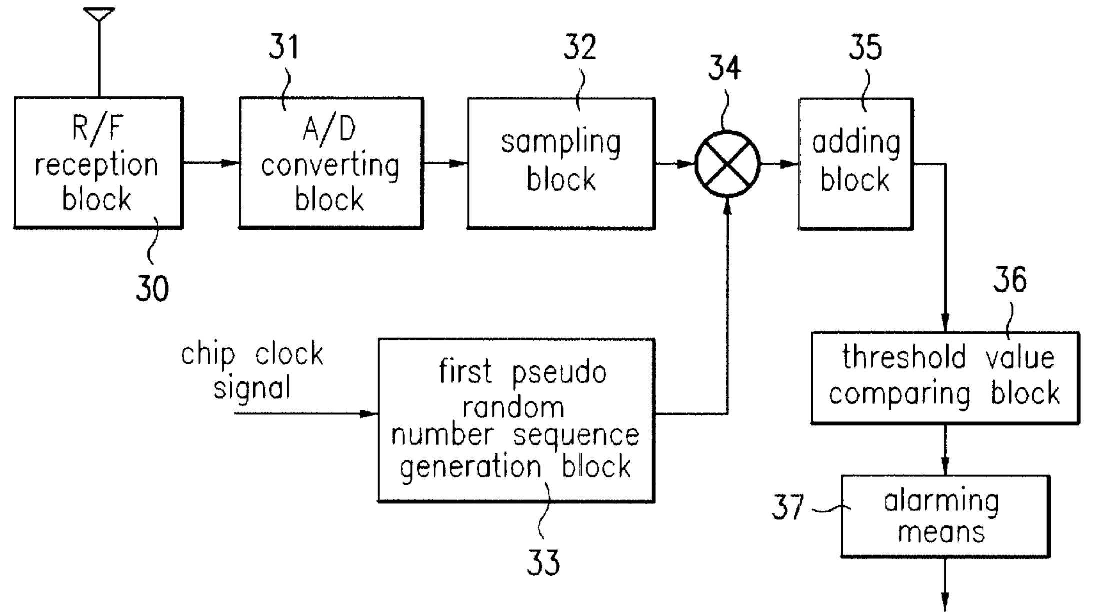
FIG. 4 illustrates a block system of an anti-theft sensing circuit in accordance with a preferred embodiment of the present invention.
Figure 5:
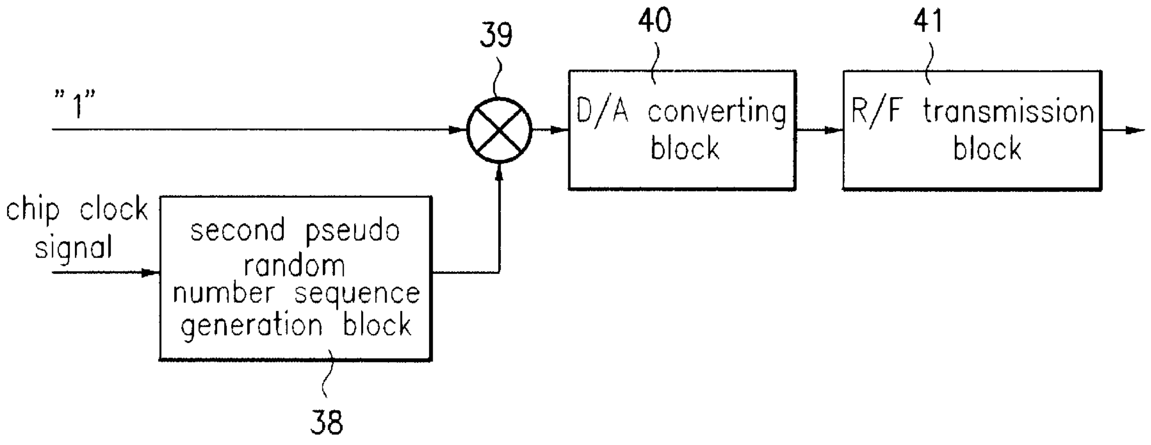
FIG. 5 illustrates a block system of a transmission system in an anti-theft circuit in accordance with a preferred embodiment of the present invention.

Reference will now be made in detail to the preferred embodiments of the present invention, examples of which are illustrated in the accompanying drawings. FIG. 4 illustrates a block system of an anti-theft sensing circuit in accordance with a preferred embodiment of the present invention, and FIG. 5 illustrates a block system of a transmission system in an anti-theft circuit in accordance with a preferred embodiment of the present invention. The anti-theft circuit for a portable device includes a transmission circuit in the portable device and a sensing circuit carried by a user. Herein, the portable device denotes various devices including personal portable telecommunication devices. The sensing circuit in the anti-theft circuit for a portable device will be explained.

Referring to FIG. 4, the sensing circuit in the anti-theft circuit for a portable device of one embodiment of the present invention to be carried by the user includes an A/D(analog-to-digital) converting block 31 for receiving an analog signal from the transmission circuit disposed in the portable device through a RF reception block 30 for converting into a digital signal; a sampling block 32 for sampling one of the digital signals from the A/D converting block 31; a first multiplication block 34 having an XOR (Exclusive OR) gate circuit for subjecting the sampled digital signal in the sampling block 32 and an output from a first pseudo random number sequence generation block 33 to multiplication block 34; an adding block 35 for adding the outputs of the first pseudo random number sequence generation block 33 for a period of time; a threshold value comparing block 36 for comparing an output of the adding block 35 to a preset threshold value to provide a 'low' signal if the output of the adding block is greater and a 'high' signal if the output of the adding block 35 is smaller, and an alarming means 37 for selectively providing an alarm signal according to the signal from the threshold value comparing block 36.

Referring to FIG. 5, the transmission system in the anti-theft circuit of the preferred embodiment of the present invention disposed in the portable device includes a second multiplication block 39 for always multiplying 'unity' to an output of the second pseudo random number sequence generation block 38, a D/A(Digital-to-Analog) converting block 40 for converting an output of the second multiplication block 39 into an analog value, a RF transmission block 41 for transmission of the analog value from the D/A converting block 40 in a RF.

Figure 6A:
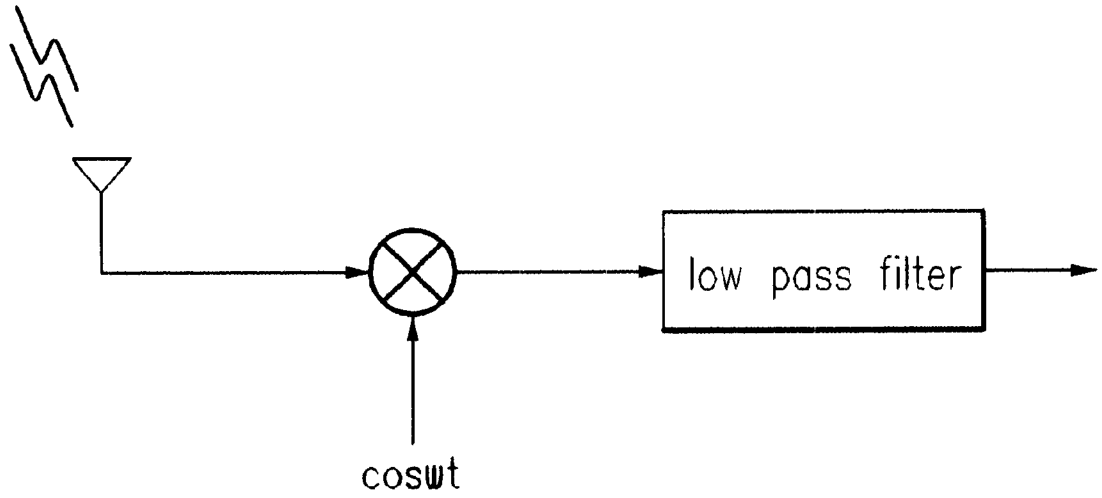
FIG. 6*a* illustrates a block diagram of a RF reception block.
Figure 6B:
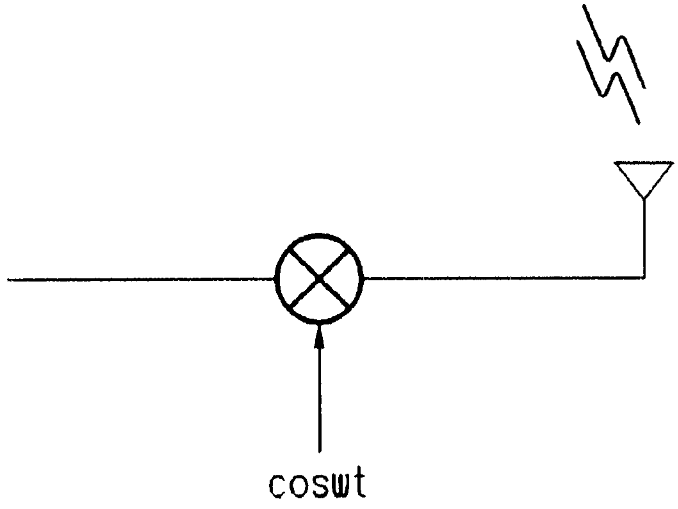
FIG. 6*b* illustrates a block diagram of a RF transmission block.

The RF reception block 30 and the RF transmission block 41 in the sensing circuit and the transmission system have the following system. FIG. 6*a* illustrates a block diagram of a RF reception block, and FIG. 6*b* illustrates a block diagram of a RF transmission block.

The RF reception block 30 has a multiplier for multiplying a data received from a reception antenna and cos ωt, and a low pass filter for making a low pass filtering of an output of the multiplier and providing to the A/D converting block 31. The RF transmission block has a multiplier for multiplying a value from the D/A converting block 40 and a cos ωt, and a transmission antenna for RF transmission of an output from the multiplier to outside.

Figure 7:
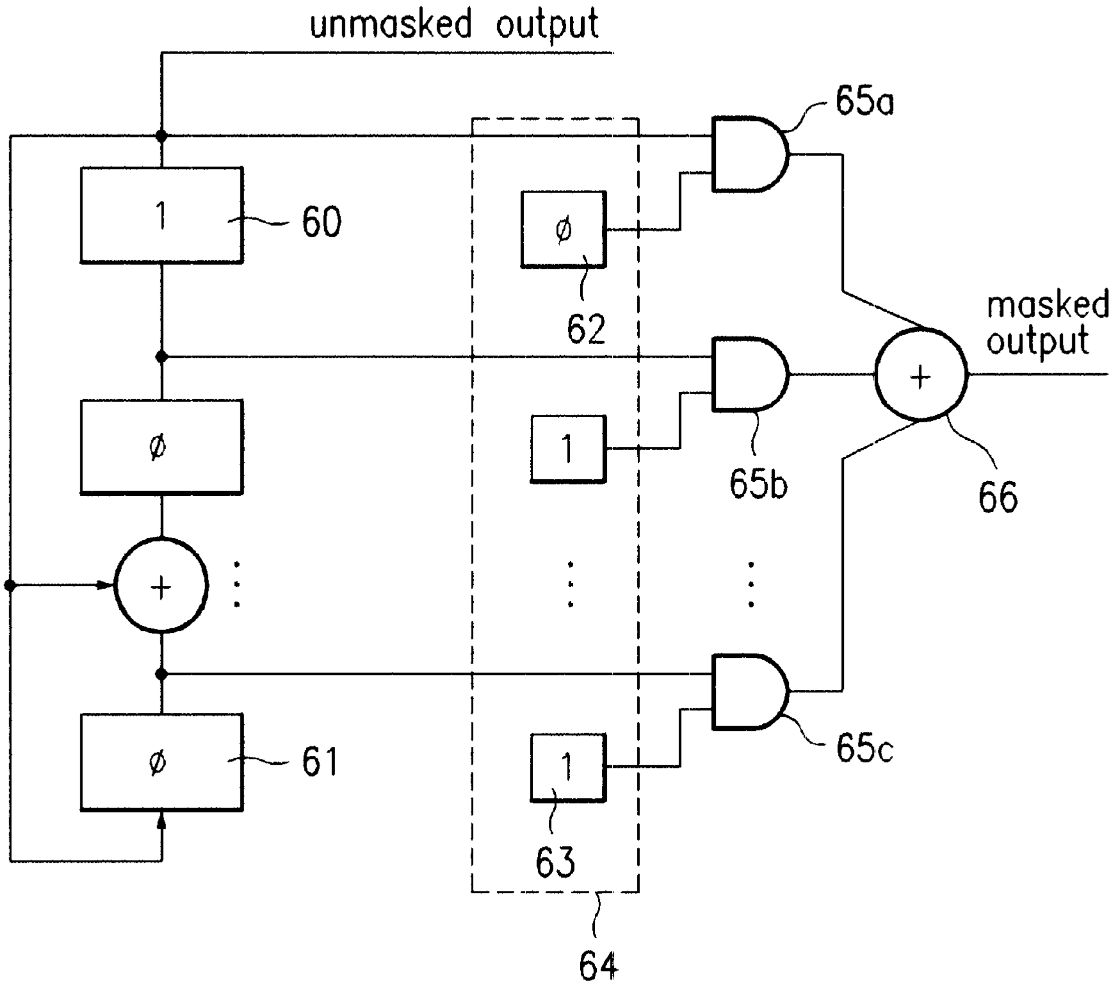
FIG. 7 illustrates a block diagram of a PN sequence generation system in accordance with a preferred embodiment of the present invention; and, FIG. 8 illustrates a correlation of PN generation of the present invention.

Systems of the pseudo random number sequence generation blocks 33 and 38 will be explained in detail. FIG. 7 illustrates a block diagram of a PN sequence generation system in accordance with a preferred embodiment of the present invention, and FIG. 8 illustrates a correlation of PN generation of the present invention.

FIG. 7 illustrates an embodiment of a PN sequence generation system, wherein, if it is a 3 bit delay device, a first block is a delay MSB block 60, a third block is a delay LSB block 61. And, for identification of the user, a first block in a mask device block 64 composed of memories, such as EEPROM is a mask MSB block 62, and a third block is a mask LSB block 63. A pseudo random number sequence generation block has a first, a second, and a third AND operation block 65*a*, 65*b*, and 65*c* each for subjecting initial values of respective bit digits in a delay block and a mask device blocks 64 to AND operation, and an adder 66 for adding operated values of the first, second, and third AND operation blocks 65*a*, 65*b*, and 65*c*.

Figure 8:
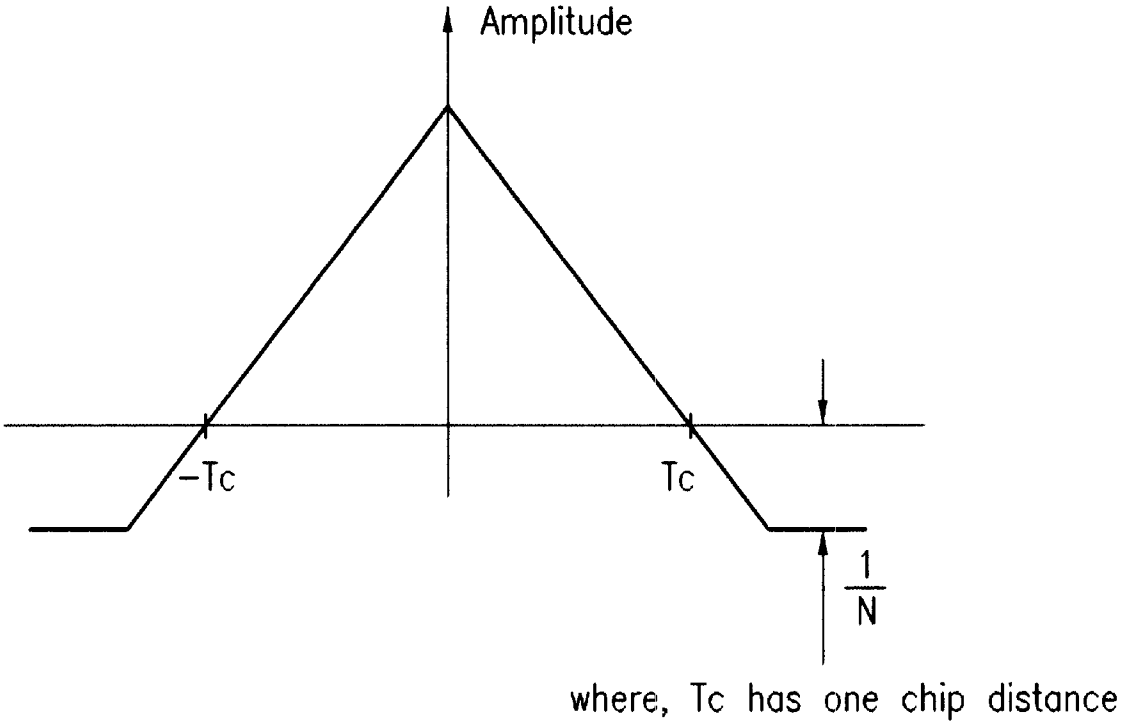

FIG. 8 illustrates a correlation of a pseudo random number sequence generation in the aforementioned pseudo random number sequence generation block.

The anti-theft alarm giving operation in the anti-theft device for a portable device of the present invention will be explained.

If it is assumed that delay bits in a pseudo random number sequence generation is three bits, and mask bit is three bits, and value of the delay bits are '1 0 0' and values of the mask bits for identification of the user is '0 1 1', outputs of the second pseudo random number sequence generation block 38 will be '0 0 1 0 1 1 1, and 0 0 1 0 1 1 1, - - - , the transmission system disposed in the portable device will have a period of $2^3-1$, i.e., 7 chip. The chip is data bits generated according to a PN clock rate in a PN generation block.

The behaviour of the PN generation block in accordance with a preferred embodiment of the present invention will be explained.

When the pseudo-random number sequence has delay bits with initial values of '1 0 0', since mask bits (seed values for identifying a user) are '0 1 1', the first AND operation block 65*a* receives a delay bit '1' and a mask bit '0' to provide '0'. And, the second AND operation block 65*b* receives a delay bit '0' and a mask bit '1' to provide '0'. Accordingly, the adder 66 provides '0'. And, the next shifted delay bits '0 1 1' are provided to the first, second, and third AND operation blocks 65*a*, 65*b*, and 65*c* respectively, to provide '0 1 1' respectively, causing the adder 66 to provide '0'. Thus, as the delay bits are repeated in an order of →1 0 0→0 1 1→1 1 0→1 1 1→1 0 1→0 0 1→0 1 0→, the adder 66 provides '0 0 1 0 1 1 1', repeatedly. If the mask bits provided are, not '0 1 1', but other values, the generated PN will differ. If sizes of the delay bits and the mask bits are, not 3 bits respectively, but larger, a size of the chip will also be larger, which is an extension of a number of numerals in the user identification code, it implies an increased admission capability of subscribers into the anti-theft circuit for a portable device of one embodiment of the present invention.

The PN generation block is a block generating 0's and 1's at random but with the same total numbers of 0's and 1's for a fixed period or interval, wherein, because, if seeds(mask bit values for user identification) which are sources for generating random numbers are different, sequences of 0's and 1's the seeds produce differ, provided the seed is unknown, the same sequence of 0's and 1's can not be produced. As shown in FIG. 5, since the value multiplied with the outputs of the second PN generation block 38 is always '1', outputs of the second multiplication block 39 are always the same with the outputs of the second PN generation block 38, which are provided to the RF transmission block 41 through the D/A converting block 40. As shown in FIG. 4, values from the RF transmission block 41 in the transmission system of the anti-theft circuit of the preferred embodiment of the present invention are provided to the RF reception block 30 in the sensing circuit of the anti-theft circuit of the preferred embodiment of the present invention. The data received in the RF reception block 30 and demodulated of its phase is digitized in the A/D converting block 31, and sampled in the sampling block 32. A sampled value is multiplied with an output of the first PN generation block 33 generating an identical pseudo random number sequence to the second PN generation block 38 in the first multiplication block 34. Outputs of the first multiplication block 34 are accumulated for a time period in the adding block 35. In this instance, if the time period deviates more than 2 chip, i.e., if the portable device and the user are distanced away more than 2 chip from each other, the accumulated value in the adding block 35 is decreased to a value below the preset threshold value, so that the alarming means 37 issues a theft alarm signal to outside of the circuit (in the case when the threshold value is set to be a value when a 2 chip deviated). For example, if it is assumed that there is no time and distance deviations between the portable device and the anti-theft sensing circuit, and outputs of the sampling block 32 and outputs of the first PN generation block 33 are multiplied and summed for a time period 'n', a value provided to the threshold value comparing block 36 is $n \times 2^{3-1}$, exactly. Herein, if it is defined that the threshold value is $(n/2) \times (2^{3-1})$, an output of the threshold value comparing block 36 will be low, so that alarming means 37 provides no alarm signal to outside of the circuit. And, if there is a time difference of more than one chip in generation of random numbers from the first, and second PN generation blocks 33 and 38 in the transmission system in the portable device and the anti-theft sensing circuit the user carries, i.e., the transmission system and the anti-theft sensing circuit are distanced away corresponding to more than one chip, the value, multiplied, summed for a time period, of outputs of the sampling block 32 in the anti-theft sensing circuit and outputs of the first PN generation block 33, and provided from the adding block 35 is substantially '0' when a characteristic of the PN sequence is taken into consideration, to provide a 'high' from the threshold value comparing block 36, for the alarming means 37 to issue an anti-theft alarm signal to outside of the device.

The aforementioned anti-theft circuit for a portable device of the present invention, in which an alarm signal is issued to the exterior of the device if distanced farther than a preset distance for prevention of the portable device, has the following advantages.

First, the use of a PN sequence correlation, which allows to dispense with a block decoding an activating signal, can simplify the system.

Second, a proper activating signal source that allows identification of each user can be assigned.

It will be apparent to those skilled in the art that various modifications and variations can be made in an anti-theft circuit for a portable device of the present invention without departing from the spirit or scope of the invention. Thus, it is intended that the present invention cover the modifications and variations of this invention provided they come within the scope of the appended claims and their equivalents.

What is claimed is:

1. An anti-theft circuit for a portable device comprising:

a transmission block disposed in the portable device having a transmission pseudo random number sequence generation block for generating a particular pseudo random number sequence and a multiplication block for always multiplying a relatively 'high' value to an output of the block for generating a particular pseudo random number sequence, the transmission block for converting an output of the multiplication block into an analog value and transmitting the analog value; and, an anti-theft sensing circuit separate from the portable device for receiving a signal transmitted from the transmission block, sampling the signal, multiplying a sampled value to a pseudo random number identical to a case of the transmission block, summing for a time period, comparing to a preset threshold value, and selectively providing an alarm signal to outside thereof according to a result of the comparison, the anti-theft sensing circuit including an RF reception block for receiving the signal from the transmission block, an analog-to-digital converting block for receiving a signal from the RF reception block and converting the signal into a digital signal, a sampling block for sampling one value from the digital signal output from the reception block, a pseudo random sequence generation block for generating a reception pseudo random number sequence, which is the same as the transmission pseudo random number sequence, a reception multiplication block for multiplying a sampled value from the sampling block with the output of the reception pseudo random sequence generation block, an adding block for accumulating outputs of the multiplication block for a time period and for summing the outputs, a threshold value comparing block for comparing an output of the adding block to a preset threshold value, to provide a 'low' signal if the output of the adding block is relatively greater and a 'high' signal if the output of the adding block is relatively smaller, and an alarm means for selectively providing an alarm signal to an exterior of the portable device according to a signal from the threshold value comparing block.

2. An anti-theft circuit as claimed in claim 1, wherein the transmission block disposed in the portable device further includes a digital-to-analog converting block for converting an output of the multiplication block into an analog value, and a RF transmission block for RF transmission of the analog value from the digital-to-analog converting block, and wherein the multiplication block multiplies a value of '1' to an output of the pseudo random number sequence.

3. An anti-theft circuit as claimed in claim 2, wherein the RF transmission block includes;

a multiplier for multiplying a cos ωt to an output of the digital-to-analog converting block, and a transmission antenna for making a RF transmission of an output of the multiplier to outside of the portable device.

4. An anti-theft circuit as claimed in claim 2, wherein outputs of the multiplication block are always the same as the outputs of the transmission pseudo random number sequence generation block because values multiplied with the outputs of the transmission pseudo random number sequence generation block are always '1'.

5. An anti-theft circuit as claimed in claim 1, wherein the alarming means provides an alarm signal to outside of the portable device when the threshold value comparing block provide a relatively 'high' value, and no alarm signal when the threshold value comparing block provide a relatively 'low' value.

6. An anti-theft circuit for a portable device comprising:

a transmission block for converting an output of the multiplication block into an analog value and transmitting the analog value and having a transmission pseudo random number sequence generation block for generating a particular pseudo random number sequence; and, an anti-theft sensing circuit separate from the portable device and having a reception pseudo random number sequence generation block, the anti-theft sensing circuit for receiving a signal transmitted form the transmission block, sampling the signal, multiplying a sampled value to a pseudo random number sequence generated by a reception pseudo random number sequence identical to a case of the transmission block, summing for a time period, comparing to a preset threshold value, and selectively providing an alarm signal to outside thereof according to a result of the comparison, wherein the pseudo random number sequence generation block in each of the transmission block and the anti-theft sensing circuit includes a delay block having delays connected in series inclusive of a first delay most significant bit (MSB) block and a last delay least significant bit (LSB) block, each for receiving, and delaying a chip clock signal, and a mask device block having mask devices inclusive of a first mask MSB and a last mask LSB, for keeping an assigned value of an individual user.

7. An anti-theft circuit for a portable device comprising:

a transmission block disposed in the portable device having a transmission pseudo random number sequence generation block for generating a particular pseudo random number sequence and a multiplication block for always multiplying a relatively 'high' value to an output of the block for generating a particular pseudo random number sequence, the transmission block for converting an output of the multiplication block into an analog value and transmitting the analog value; and, an anti-theft sensing circuit separate from the portable device for receiving a signal transmitted from the transmission block and having a reception pseudo random number sequence generation block, sampling the signal, multiplying a sampled value to a pseudo random number generated by the reception pseudo random number sequence generation block and identical to a case of the transmission block, summing for a time period, comparing to a preset threshold value, and selectively providing an alarm signal to outside thereof according to a result of the comparison, wherein the transmission and reception pseudo random number sequence generation blocks in each of the transmission block and the anti-theft sensing circuit include a delay block having delays connected in series inclusive of a first delay most significant bit (MSB) block and a last delay least significant bit (LSB) b lock, each for receiving, and delaying a chip clock signal, a mask device block having mask devices inclusive of a first mask MSB and a last mask LSB, for keeping an assigned value of an individual user, wherein the pseudo random number sequence further includes a plurality of AND operation blocks each for subjecting initial values of each of bits of the delay block and the mask device block to AND operation, and an adder for adding operation resultants of the plurality of AND operation blocks.

8. An anti-theft circuit as claimed in claim 7, wherein, when the delay bits in the pseudo random number sequence generation is three bits, and mask bit is three bits, and values of the delay bits are '1 0 0' and values of the mask bits for identification of the user are '0 1 1', outputs of the pseudo random number sequence generation block are '0 0 1 0 1 1 1, 0 0 1 0 1 1 1, - - - , ' with a period of $2^{3-1}$ or a 7 chip.

9. An anti-theft circuit as claimed in claim 8, wherein, if it is assumed that there is no difference in time and distance between the portable device and the anti-theft sensing circuit, and an output of the sampling block and an output of the pseudo random number sequence generation block are multiplied and added for a time period 'n', a value provided to the threshold value comparing block is $n \times 2^{3-1}$.

10. An anti-theft circuit for a portable device comprising:

a transmission block disposed in the portable device, the transmission block for converting an output of the multiplication block into an analog value and transmitting the analog value as signal, the transmission block including a transmission pseudo random number sequence generator block for generating a pseudo random number sequence, a transmission multiplication block for multiplying the output of the second pseudo random number sequence generation block with a relatively high value for generating an transmission pseudo random number sequence; and an anti-theft sensing circuit separate from the portable device, the anti-theft sensing circuit including an RF reception block for receiving the signal from the transmission block, an analog to digital converting block for receiving a signal from the reception block and converting the signal into a digital signal, a sampling block for sampling one value from the digital signal output from the reception block, a reception pseudo random sequence generation block for generating a reception pseudo random number sequence, which is the same as the transmission pseudo random number sequence a reception multiplication block for multiplying a sampled value from the sampling block with the output of the reception pseudo random sequence generation block, an adding block for accumulating outputs of the reception multiplication block for a time period and for summing the accumulated outputs, a threshold value comparing block for comparing an output of the adding block to a preset threshold value, to provide a 'low' signal if the output of the adding block is relatively greater and a 'high' signal if the output of the adding block is relatively smaller, and an alarm unit for selectively providing an alarm signal to an exterior of the portable device according to a signal from the threshold value comparing block.

* * * * *